$3,452,035$

2 - AMINO - 5 - (5 - NITRO - 1 - SUBSTITUTED-2 - IMIDAZOLYL) - 1,3,4 - THIADIAZOLES AND OXADIAZOLES

Gerald Berkelhammer, Trenton, and Goro Asato, Titusville, N.J., assignors to American Cyanamid Company, Stamford, Conn., a corporation of Maine No Drawing. Continuation-in-part of application Ser. No. 604,158, Dec. 23, 1966. This application Aug. 10, 1967, Ser. No. 659,596

Int. Cl. C07d 85/52, 91/60; A61k 27/00
U.S. Cl. 260—306.8    8 Claims

ABSTRACT OF THE DISCLOSURE

Novel substituted nitroimidazolyl-thiadiazoles and oxadiazoles are described along with methods of preparing and using the same. These compounds have been found useful in controlling the growth of pathogenic microorganisms such as bacteria and protozoa in an animal host.

---

The present invention is a continuation-in-part of our application Ser. No. 604,158, filed Dec. 23, 1966, now abandoned.

BACKGROUND OF THE INVENTION

The present invention represents compounds which are both highly effective at relatively low concentrations against a broad spectrum of microorganisms, and additionally provide a relatively satisfactory margin of safety. The novel substituted imidazolyl compounds of the present invention are 5 to 10 times more active than the imidazolyls of the prior art, providing effectiveness at relatively low concentrations, as well as satisfactory margins of safety.

Imidazolyl compounds, in which the heterocyclic rings are joined by a methyleneamino bridge, have been prepared and found to have some antibacterial and antiprotozoal activity; however, such compounds have not been entirely satisfactory for these purposes. The concentration at which such compounds are active is generally much higher than the desirable level; therefore, said compounds do not provide a satisfactory margin of safety. Illustrative of said compounds which have been prepared and found to have such activity are 3-[(1-methyl-5-nitrodiazolylmethylene) - amino] - 2 - oxazolidinone and 1 - [(1 - methyl - 5 - nitro - 2 - imidazolylmethylene)-amino]-2-imidazolidinone.

SUMMARY OF THE INVENTION

The subject matter of the present invention relates to novel 1-substituted-5-nitro-2-imidazolyl compounds. More particularly, the invention relates to compounds having the following general formula:

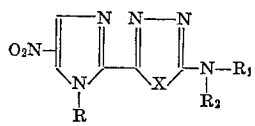

wherein R is selected from the group consisting of lower alkyl, hydroxy lower alkyl and lower alkanoyloxy lower alkyl; X is selected from the group consisting of oxygen and sulfur; and $R_1$ and $R_2$ are selected from the group consisting of hydrogen, lower alkyl, hydroxy lower alkyl, formyl, lower alkanoyl, monohalolower alkanoyl, polyhalo lower alkanoyl, aminolower alkyl, lower alkyl aminolower alkyl;

taken together is selected from the group consisting of —N=CHN (lower alkyl)$_2$, piperazine, lower alkylpiperazine, benzylpiperazine, phenylpiperazine, tolylpiperazine, lower alkoxyphenylpiperazine, halophenylpiperazine, nitrophenylpiperazine, pyridylpiperazine, quinolylpiperazine, thiazolylpiperazine, lower alkoxycarbonylpiperazine, and lower alkylthio thionocarbonylpiperazine. The term "lower alkyl" as employed in the instant specification and claims is intended to include either straight or branched chain having from 1 to 4 carbon atoms. In addition, the invention relates to a method of controlling the growth of microorganisms in an animal host which comprises administering to the animal therapeutically effective quantities of the above compound, as well as a composition of matter comprising said compound and a suitable carrier.

PREPARATION OF THE NOVEL SUBSTITUTED IMIDAZOLYLS OF THE PRESENT INVENTION

In many instances the novel substituted imidazolyl compounds of the present invention are prepared by oxidative cyclization of various thiosemicarbazones and semicarbazones of 1-substituted-5-nitro-2-imidazolecarboxaldehyde. Suitable oxidizing agents for such cyclization of the thiosemicarbazone to aminothiadiazoles include a wide variety of ferric salts such as ferric ammonium sulfate, ferric chloride, ferric nitrate, ferric acetate, sodium ferricyanide, sodium ferric oxalate, potassium ferric sulfate, and the like. The cyclizations of the semicarbazones to aminooxadiazoles are generally carried out with such agents as sodium hypobromite, sodium hypoiodite, and bromine with sodium acetate. The reactions are generally carried out at an elevated temperature between 50 and 150° C., depending on the particular moiety being prepared.

A number of the 2-(2-substituted amino-5-thiadiazolyl)-1-substituted - 5 - nitroimidazoles can be prepared by the reaction of 2 - (2 - halo - 5 - thiadiazolyl) - 1-substituted - 5 - nitroimidazoles with the appropriate primary or secondary amines in an organic solvent, either in the presence of excess amine or with the use of other acid acceptors, as for example, aqueous sodium bicarbonate solution, usually at between 25 and 125° C.

In the preparation of compounds having the above general formula wherein R represents a hydroxy lower alkyl group, it is often practical to first synthesize the corresponding ester, as for example, a compound of the formula:

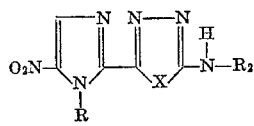

wherein R is lower alkanoyloxy lower alkyl and X and $R_2$ are as defined above, and then treat the thus formed ester with a strong mineral acid followed by pH adjustment to above about pH 7, thereby yielding the desired product. In many cases, it is found that the conditions used for cyclization 1-(2-lower alkanoyloxy lower alkyl)-5-nitro-2-imidazole carboxaldehyde thiosemicarbazones are sufficiently acidic to give rise directly to the 2-(2-amino-5-thiadiazolyl)-1-(hydroxy lower alkyl)-5-nitroimidazoles.

Where it is desired to prepare the 2-(2-formamido-5-thiadiazolyl) - 1 - substituted - 5 - nitroimidazole, or the 2 - (2 - acylamino - or 2 - haloacylamino - 5 - thiadiazolyl) - 1 - substituted - 5 - nitroimidazole, it is practical to first synthesize the 2-(2-amino-5-thiadiazolyl)-1-substituted-5-nitroimidazole, and then treat the product with formic acid, in the case of the preparation of the 2-(2-formamido - 5 - thiadiazolyl) - 1 - substituted - 5 - nitroimidazole, or with an anhydride of the formula (lower alkanoyl)$_2$ or (halo lower alkanoyl)$_2$ or with the appropriate acid chloride in the instance of the preparation of the 2 - (2 - acylamino or 2 - haloacylamino - 5 - thiadiazolyl) - 1 - substituted - 5 - nitroimidazole. Similar reactions give the corresponding oxadiazolyl compounds. These reactions are usually carried out at an elevated temperature, particularly at temperatures between 50 and 150° C.

The 2-(2-amino-5-thiadiazolyl)-1-lower alkanoyloxy lower alkyl-5-nitroimidazoles and the corresponding oxadiazolyl compounds can be made by esterifying the 2-(2-amino-5-thiadiazolyl or 5-oxadiazolyl)-1-hydroxy lower alkyl-5-nitroimidazoles by heating with an aliphatic acid in the presence of a mineral acid catalyst. If instead of an aliphatic acid, an aliphatic acid anhydride is employed, the products are 2-(2-lower alkanoyl-amino-5-thiadiazolyl or 5-oxadiazolyl)-1-lower alkanoyl lower alkyl-5-nitroimidazoles. In the latter case, a catalyst is usually not necessary. In both instances, reaction temperatures of from 50 to 150° C. are frequently employed.

For the preparation of N,N'-dilower alkyl-N'-[5-(1-substituted - 5 - nitro-2-imidazolyl)thiadiazol-2-yl]formamidines, products of the reaction of N,N-dilower alkyl formamides with phosgene, phosphorus oxychloride, or thionyl chloride are reacted with 2-(2-amino-5-thiadiazolyl)-1-substituted 5-nitroimidazoles in an organic solvent, as for example, in an excess of the N,N-dilower alkyl formamide, usually at the ambient temperature.

The novel compounds of the instant invention are highly effective in controlling infections of pathogenic microorganisms in a warm-blooded animal host; said compounds may be administered to the animals in admixture with their feed or drinking water. Furthermore, the compounds may be administered in the form of tablets, pills, capsules or the like, or parenterally by injection either intramuscularly or subcutaneously. The concentration employed in feed or water may be in the range of from 5 to 1,000 parts per million, preferably 15 to 500 parts per million; the most preferred concentration being about 200 parts per million. The above compounds have demonstrated effectiveness against *Salmonella* infections when the compound was administered in as little as 0.025% concentration in the diet of chicks and mice. Furthermore, the compounds have shown significant control of *Trichomonas vaginalis* and amoebiasis in warm-blooded animals such as mice and rats when administered at approximately 6 to 18 mg. per kg. of body weight in a single oral dose or in feed. In addition, some of the compounds provide 100% control of *Escherichia coli* infections in chicks when administered at about 40 mg. per kg. of body weight in a single oral dose. The present compounds show good anti-coccidial activity and are particularly effective against *Eimeria tenella* as shown hereinafter.

DETAILED DESCRIPTION

The following examples are provided for illustrative purposes and may include particular features of the invention; however, the examples should not be construed as limiting the invention, many variations of which are possible without departing from the spirit or scope thereof. Parts are by weight unless otherwise indicated.

EXAMPLE I

Preparation of 2-(2-amino-5-thiadiazoyly)-1-methyl-5-nitroimidazole

A mixture of 4.71 gm. 0.03 mole, of 1-methyl-2-hydroxymethyl-5-nitroimidazole, and 13.3 gm., 0.03 mole, of lead tetraacetate in 200 ml. of benzene, is refluxed while stirring magnetically for about 18 hours, cooled and filtered. The filtrate is washed with 50 ml. of saturated sodium carbonate solution. The organic phase is then separated, and the aqueous phase extracted twice with 30 ml. of chloroform. The combined organic phase is then dried over magnesium sulfate. After filtering and evaporating the organic phase to dryness, the filtrate gives 4.2 gm. of pale yellow 1-methyl-5-nitro-2-imidazolecarboxaldehyde, which is dissolved in 25 ml. of hot ethanol, then added to 2.5 gm. of thiosemicarbazide in 20 ml. of boiling ethanol containing two drops of concentrated hydrochloric acid. The mixture is then boiled for a few minutes with stirring, cooled and bright yellow crystals of the thiosemicarbazone of the above aldehyde are collected. The process yields 5.3 gm., which constitutes a 77.4% overall yield, said material having a melting point of 227° C. (decomposition).

To 25 ml. of hot water containing 5.7 gm., of ferric ammonium sulfate dodecahydrate, 2.68 gm. of the above thiosemicarbazone is added, and the mixture is stirred magnetically in a boiling water bath. After 1 hour, an additional 75 ml. of hot water containing 17.1 gm. of ferric ammonium sulfate dodecahydrate is added to the above mixture. The mixture is then heated for approximately 3 hours in a boiling water bath, and filtered while still hot, yielding orange brown crystals which are washed thoroughly with hot water. The yield is 2.7 gm., having a melting point of from 259° to 260° C. (decomposition). This product is dissolved in about 20 ml. of hot dimethyl-formamide, filtered and the warm filtrate poured on ice. The precipitated product is washed thoroughly first with water, and then cold acetone, giving a yellow product which is dried in vacuo at 100° C. for several hours. The purified product weighs 1.55 gm., and has a melting point of from 268° to 270° C. (decomposition). The product is then submitted to analysis; calculating for carbon, hydrogen, nitrogen and sulfur, the actual values agreed closely with the theoretical values.

EXAMPLE II

Preparation of 1-methyl-5-nitro-2-imidazolecarboxaldehyde 4',4'-dimethyl-3'-thiosemicarbazone A mixture of 14.1 gm., 0.1 mole, of 1,2-dimethyl-5-nitroimidazole, 12 gm., 0.1 mole, of selenium dioxide and 100 ml. of diethyleneglycol dimethyl ether is refluxed while stirring magnetically for approximately 4 hours. The mixture is then cooled and filtered through a layer of diatomaceous earth into a warm solution of 11.5 gm., 0.1 mole of 4',4'-dimethyl-3'-thiosemicarbazide in 50 ml. of water and 10 ml. of glacial acetic acid. A precipitate forms immediately. The mixture is cooled and filtered to give 7.5 gm. of yellow crystals, which have a melting point of from 205° to 210° C. The crystals are recrystallized twice from methyl Cellosolve and once from ethanol,

EXAMPLE III

Preparation of 2-(2-methylamino-5-thiadiazolyl)-1-methyl-5-nitroimidazole

A suspension of 20 gm. of ferric ammonium sulfate dodecahydrate in 100 ml. of water is warmed on a steam bath until the solid is completely dissolved. To the above solution 9.6 gm. 0.039 mole, of 1-methyl-5-nitro-2-imidazolecarboxaldehyde-4'-methyl-3-thiosemicarbazine is added, and stirred on the steam bath for an additional 90 minutes. A warm solution containing 59 gm., 0.122 mole of ferric ammonium sulfate dodecahydrate in 300 ml. of water is added to the above mixture. The mixture is stirred on the steam bath for an additional 2 hours and filtered. The precipitate is washed with water and acetone to give 6.9 gm. of a yellow solid having a melting point of from 230° to 238° C. Recrystallization from 700 ml. of hot ethyl acetate gives 3.3 gm. of bright yellow needles having a melting point of 238° C.

EXAMPLE IV

Preparation of 2-(2-dimethylamino-5-thiadiazolyl)-1-methyl-5-nitroimidazole

A warm suspension of 9.2 gm. of 1-methyl-5-nitro-2-imidazolecarboxaldehyde 4',4'-dimethyl-3'-thiosemicarbazone in 100 ml. of water is added to a warm solution of 69.4 gm. of ferric ammonium sulfate dodecahydrate in 400 ml. of water. The mixture is magnetically stirred on a steam bath for approximately 4 hours, and filtered. The precipitate is washed with water and acetone giving 8.6 gm. of a brown solid having a melting point of from 238° to 240° C. (decomposition). Two recrystallizations from N,N-dimethylformamide gives 3.6 gm. of yellow crystals having a melting point of 252° C.

EXAMPLE V

Preparation of 2-(2-ethylamino-5-thiadiazolyl)-1-methyl-5-nitroimidazole and 2-(2-dimethylamino-5-thiadiazolyl-1-ethyl-5-nitroimidazole The ethylamino compound is prepared by employing the procedure set forth in Example I, with the exception that ethylthiosemicarbazide is substituted for thiosemicarbazide.

With regard to the dimethylamino compound, said compound is prepared by employing the procedure set forth in Example II, with the exception that 1-ethyl-2-methyl-5-nitroimidazole is utilized instead of 1,2-dimethyl-5-nitroimidazole. The process yields 1-ethyl-5-nitro-2-imidazolecarboxaldehyde, 4',4'-dimethyl-3'-thiosemicarbazone, which is cyclized as in Example IV to 2-(2-dimethylamino-5-thiadiazolyl)-1-ethyl-5-nitroimidazole.

EXAMPLE VI

Preparation of 2-(2-formamido-5-thiadiazolyl)-1-methyl-5-nitroimidazole

The above compound is prepared by refluxing 8 gm. of 2-(2-amino-5-thiadiazolyl)-1-methyl-5-nitroimidazole in 30 ml. of 98% formic acid for 10 hours, cooling, and adding the mixture to saturated sodium bicarbonate solution, and the solid collected. The compound melts at 225° C. to 227° C.

EXAMPLE VII

Preparation of 2-(2-acetamido-5-thiadiazolyl)-1-methyl-5-nitroimidazole

The above compound is prepared by heating under reflux for 30 minutes a mixture of 14 gm. of 2-(2-amino-5-thiadiazolyl)-1-methyl-5-nitroimidazole in 280 ml. of acetic anhydride. The mixture is evaporated to dryness, and the solid residue is washed thoroughly with ether giving 16.4 gm. of a yellow solid having a melting point of 235° C. (decomposition).

EXAMPLE VIII

Preparation of 1-(2-acetoxyethyl)-5-nitro-2-imidazolecarboxaldehyde

A 6.27 gm. portion of 1-(2-acetoxyethyl)-2-hydroxymethyl-5-nitroimidazole is refluxed with 13.3 gm. of lead tetraacetate in 200 ml. of benzene for 18 hours, cooled, and filtered. The filtrate is washed with 50 ml. of saturated sodium carbonate solution, and the organic phase is separated therefrom. The remaining aqueous phase is twice extracted with 30 ml. of chloroform, and then combined with the above separated organic phase. The combined organic phases are dried under magnesium sulfate, and filtered. The organic solvents are then removed in vacuo, giving the above aldehyde.

EXAMPLE IX

Preparation of 2-(2-amino-5-thiadiazolyl)-1-(2-hydroxyethyl)-5-nitroimidazole

A 14.25 g. sample of the aldehyde prepared in Example VIII is treated with 5.72 g. of thiosemicarbazide in 150 ml. of 95% ethanol containing a drop of concentrated hydrochloric acid and the mixture is heated on a steam bath for 20 minutes. The hot solution is filtered to remove insoluble materials, cooled and the yellow-brown crystals are collected. The yield of 1-(2-acetoxyethyl)-5-nitro-2-imidazolecarboxaldehyde thiosemicarbazone is 18.8 g. after drying in a vacuum oven at 60° for 2½ hours. Recrystallization of the product gives a yellow solid, melting point 181–183.5° C.

The thiosemicarbazone (12 g.) is added to 77 g. of ferric ammonium sulfate dodecahydrate in 500 ml. of water at 60° and the mixture is heated to 90–100° for 4 hours. The mixture is cooled, the solid collected and washed with water. Only 0.92 g. (Melting Point 249–251°) of product is soluble in a large volume of acetone. The remaining product is dissolved in 150 ml. of dimethylformamide, filtered and the filtrate evaporated to dryness to give a solid. This solid is treated with about 20 ml. of acetone, slurried, cooled and collected to give yellow crystals. After drying in an air stream overnight, 5.5 g. (Melting Point 253.5–255°) of 2-(2-amino-5-thiadiazolyl)-1-(2-hydroxyethyl)-5-nitroimidazole is obtained; no carbonyl absorption band is present in the infrared spectrum. Thus, it is not necessary to perform a separate hydrolysis step for removal of the acetyl group.

EXAMPLE X

Preparation of 2-dichloroacetamido-5-(1-methyl-5-nitro-2-imidazolyl)-1,3,4-thiadiazole Five grams of 2-amino-5-(1-methyl-5-nitro-2-imidazolyl)-1,3,4-thiadiazole is added to 25 ml. of dichloroacetic anhydride, and the mixture boiled gently for a few minutes. After standing at room temperature for four hours, 200 ml. of diethyl ether is added, and the mixture stored at −10° C. overnight. The solid is collected, dried, and recrystallized from a mixture of 300 ml. of ethanol and 50 ml. of 2-methoxyethanol to yield 4.5 g. of pure product melting at 246°–247° C.

EXAMPLE XI

Preparation of 2-(2-amino-5-oxadiazolyl)-1-methyl-5-nitroimidazole

Method A

In 180 ml. of hot water, 9.3 grams (0.06 mole) of 1-methyl-5-nitro-2-imidazolecarboxaldehyde is slurried while 6.7 grams (0.06 mole) of semicarbazide hydrochloride is added portionwise. After 15 minutes of heating, the mixture is cooled in a refrigerator overnight. The solid is then collected and washed with water and methanol, respectively, to give a yellow product, melting point 272°–273° C. (dec.). After drying at 100° for 2 hours under reduced pressure, 11.94 grams of 1-methyl-5-nitro-2-imidazolecarboxaldehyde semicarbazone is obtained.

This semicarbazone (6.35 grams or 0.03 mole) is added to 10 grams of anhydrous sodium acetate in 50 ml. of glacial acetic acid and 1.25 ml. of bromine is added with continuous stirring. The mixture is heated gradually to give a nearly clear red solution at 50° C. which becomes increasingly turbid with time. After heating at 75±3° for 3 hours, the mixture is cooled and poured on ice. The yellow solid is collected, washed with water, then with methanol, and dried under reduced pressure at 70° C. for 3 hours to give 5 grams of crude 2-amino-5-(1-methyl-5-nitro-2-imidazolyl)oxadiazole, Melting Point 284°–287° C. (dec.). This material is dissolved in boiling dimethylformamide, ethanol added, and the mixture cooled to give yellow crystals, Melting Point 291°–293° C. (dec.).

Method B

In 25 ml. of methanol, 0.93 grams (5 mmole) of 1-methyl-5-nitro-2-imidazolecarboxylic acid hydrazide and 0.53 grams (5 mmole) of cyanogen bromide are refluxed for 2 hours, cooled, and poured on ice to give a pale yellow solid. This solid is collected, washed with water, and dried under reduced pressure at 100° C. for 2 hours to give 0.65 grams, Melting Point 286°–288° C. (dec.), of 2-amino-5-(1-methyl-5-nitro-2-imidazolyl)oxadiazole.

EXAMPLE XII

Preparation of 1-methyl-5-nitro-2-imidazolecarboxaldehyde-4-methylsemicarbazone

To a solution of 8.5 grams (0.055 mole) of 1-methyl-5-nitro-2-imidazolecarboxaldehyde in 50 ml. of ethanol is added a solution of 5.0 grams (0.056 mole) of 4-methylsemicarbazide in 25 ml. of methanol and 10 ml. of water containing 2–4 drops of concentrated hydrochloric acid. The resulting solution is heated at 60°–70° C. until a yellow solid starts to separate and then stored at 0° C. for 1 hour; 12.2 grams (98%) of 1-methyl-5-nitro-2-imidazolecarboxaldehyde-4-methylsemicarbazone is obtained melting at 221°–223° C.

EXAMPLE XIII

Preparation of 2-(2-methylamino-5-oxadiazolyl)-1-methyl-5-nitroimidazole

Seven grams (0.031 mole) of 1-methyl-5-nitro-2-imidazolecarboxaldehyde-4-methylsemicarbazone is dissolved in 85 ml. of glacial acetic acid, 16 grams of anhydrous sodium acetate added, and a solution of 2.5 ml. of bromine in 20 ml. of glacial acetic acid added. The resulting mixture becomes a clear solution as it is heated at 70°–80° C. for 2–4 hours. The solvent is evaporated under reduced pressure and the residue treated with shaved ice until a yellow suspension is obtained. The product is collected, washed with cold water, methanol, and finally with ether. Recrystallization from ethanol containing N,N-dimethylformamide affords 2.7 grams (39%) of a yellow product melting at 239°–241° C. In another preparation, a 63% yield of product melting at 237°–239° C. is obtained without recrystallization.

EXAMPLE XIV

Preparation of 1-methyl-5-nitro-2-imidazolecarboxaldehyde-4,4-dimethylsemicarbazone A solution of 780 mg. (5 millimoles) of 1-methyl-5-nitro-2-imidazolecarboxaldehyde in 10 ml. (95%) of ethanol is treated with 520 mg. (5 millimoles) of 4,4-dimethylsemicarbazide and one drop of concentrated hydrochloric acid to give a yellow solid. The mixture is heated at 40° C. for 5 minutes, cooled to 0° C., and 1,180 mg. (98%) of crystalline 1-methyl-5-nitro-2-imidazolecarboxaldehyde 4,4-dimethylsemicarbazone is obtained. Recrystallization from ethanol containing N,N-dimethylformamide affords 900 mg. (74%) of material melting at 206°–208° C.

EXAMPLE XV

Preparation of 2-(2-dimethylamino-5-oxadiazolyl)-1-methyl-5-nitroimidazole

The procedure of method A of Example XI is followed except that 7.5 grams (0.31 mole) of 1-methyl-5-nitro-2-imidazolecarboxaldehyde 4,4-dimethylsemicarbazone is used. The product is recrystallized from ethanol to give 5.2 grams (69%) of material melting at 180°–182 C.

EXAMPLE XVI

Preparation of 2-(2-acetamido-5-oxadiazolyl)-1-methyl-5-nitroimidazole

Four grams of acetyl chloride are slowly added to 3.6 grams (0.017 mole) of 2-(2-amino-5-oxadiazolyl)-1-methyl-5-nitroimidazole suspended in a mixture of 44 ml. of pyridine and 35 ml. of benzene. The addition is completed in 30 minutes, the mixture heated at 60°–70° C. for 10 minutes, and then poured into 500 ml. of ice and water. After the resulting mixture is stirred for 1½ hours, the product separates. Recrystallization from 150 ml. of acetone containing some N,N-dimethylformamide affords 2.4 grams (56%) of pale yellow product. A second recrystallization from acetone gives 2.1 g. of product, melting point 224–225° C.

EXAMPLE XVII

Preparation of N,N-dimethyl-N'-[5-(1-methyl-5-nitro-2-imidazolyl)-thiadiazol-2-yl]formamidine Phosgene gas is bubbled into 100 ml. of N,N-dimethylformamide at 5–10° C. until 2.0 g. (0.02 mole) is absorbed and a crystalline suspension is formed. This suspension is added in portions to a stirred mixture of 4.5 g. (0.02 mole) of 2-(2-amino-5-thiadiazolyl)-1-methyl-5-nitroimidazole and 100 ml. of N,N-dimethylformamide at 25° C. After 30 minutes the reaction mixture is diluted with 200 ml. of diethyl ether, and the pale yellow solid is collected, washed with ether, and dried. Treatment of this material with 150 ml. of water and drying affords 5.0 g. (89%) of brilliant yellow solid melting at 230–232° C.

EXAMPLE XVIII

Preparation of 1-methyl-5-nitro-2-imidazole carboxaldehyde-4'-carbethoxy-1'-piperazine thiocarbohydrazone The above compound is prepared by the procedure of Example II, 23.2 gm., 0.1 mole, of 4-carbethoxypiperazine-1-thiocarbohydrazide replacing the 4,4-dimethyl-3-thiosemicarbazide. The yield is 8.6 gm. and the melting point 182°–183° C.

EXAMPLE XIX

Preparation of 2-[2-(4-carbethoxy-1-piperazinyl)-5-thiadiazolyl]-1-methyl-5-nitroimidazole A suspension of 6.4 gm., 0.0174 mole, of 1-methyl-5-nitro-2-imidazolecarboxaldehyde - 4 - carbethoxy-1-piperazine thiocarbohydrazone in 200 ml. of boiling ethanol is stirred as a solution of 35 mg. of ferric ammonium sulfate dodecahydrate in 200 ml. of hot water is added in one portion. A deep red-brown solution results. After stirring and heating on the steam bath for four hours, a precipitate is present. This is collected, washed with water, dried and recrystallized from hot ethanol to give 3.6 gm. of the title compound melting at 179–181° C.

EXAMPLE XX

Preparation of 2-[2-(hydroxyethylamino)-5-thiadiazolyl]-1-methyl-5-nitroimidazole A solution of 1.3 gm., 0.0058 mole of 2-(2-amino-5-thiadiazolyl)-1-methyl-5-nitroimidazole is dissolved in 25 ml. of concentrated hydrochloric acid, cooled to 5° C., stirred, and treated during five minutes with a solution of 0.5 gm., 0.0073 mole, of sodium nitrite in 2 ml. of water. The mixture is kept at room temperature for eighteen hours. The precipitate present is collected, washed with water, dried, and then extracted with warm acetone. Removal of the acetone leaves a solid residue which is recrystallized from a mixture of acetone and diethylether to give 0.16 gm. of 2-(2-chloro-5-thiadiazolyl)-1-methyl-5-nitroimidazole as yellow crystals, melting at 135° C.–137° C.

A mixture consisting of 4.9 gm., 0.02 mole, of 2-(2-chloro-5-thiadiazolyl)-1-methyl-5-nitroimidazole, 3.0 gm., 0.05 mole, of ethanolamine, and 50 ml. of p-dioxane is stirred at room temperature for twenty-four hours. The precipitate is collected, washed with aqueous sodium bicarbonate solution, dried and recrystallized from methanol to give the pure compound melting at 208–209° C. Working up the mother liquors gives additional material, the total yield being 3.4 gm.

EXAMPLE XXI

Preparation of 2-[2-(3-dimethylaminopropylamino)-5-thiadiazolyl]-1-methyl-5-nitroimidazole A mixture consisting of 3.8 gm., 0.0155 mole of 2-(2-chloro-5-thiadiazolyl) - 1 - methyl-5-nitroimidazole, prepared as in Example XX, 2.5 gm., 0.029 mole of 3-dimethylaminopropylamine, 2.1 gm. 0.025 mole, of sodium bicarbonate and 100 ml. of benzene is refluxed for twenty-two hours. The reaction mixture is cooled to room temperature, washed with aqueous sodium bicarbonate and sodium chloride solutions. Cooling to 5° C. gives a crystalline precipitate which is collected and recrystallized from benzene to give the pure compound melting at 153°–154° C. More product is obtained from the mother liquors to give an overall yield of 3.0 gm.

EXAMPLE XXII

Preparation of 2-[2-(4-phenyl-1-piperazinyl)-5-thiadiazolyl]-1-methyl-5-nitroimidazole A mixture consisting of 2.45 gm., 0.01 mole, of 2-(2-chloro-5-thiadiazolyl)-1-methyl-5-nitroimidazole, prepared in Example XX, 1.62 gm., 0.01 mole, of 1-phenylpiperazine, 1.0 gm., 0.012 mole, of sodium bicarbonate, and 50 ml. of benzene is stirred at reflux for eight hours. After cooling to room temperature, the insolubles are collected, washed with water to remove inorganic salts, and dried. Recrystallization from 2-methoxyethanol gives 2.4 gm. of orange crystals, melting at 251°–253° C.

EXAMPLE XXIII

Preparation of 2-amino-5-[1-(2-hydroxyethyl)-5-nitro-2-imidazolyl]oxadiazole 1-(2 - hydroxy)-5-nitro-2-imidazolecarboxaldehyde (1-mole) is treated with 1 mole of semicarbazide hydrochloride in ethanol to give nearly a quantitative yield of semicarbazone. This product is treated with bromine and sodium acetate in the manner described in Method A of Example XI to give 2-amino-5-[1-(2-hydroxyethyl)-5-nitro-2-imidazolyl]oxadiazole.

EXAMPLE XXIV

Preparation of 2-(2-amino-5-thiadiazolyl)-1-(2-acetoxyethyl)-5-nitroimidazole

The sample (0.1 g.) of 2-amino-5-[1-(2-hydroxyethyl)-5-nitro-2-imidazolyl]thiadiazole is dissolved in 2 ml. of hot glacial acetic acid and a drop of concentrated sulfuric acid is added. The solution is refluxed for 45 minutes, cooled and poured on ice to give a yellow solid. This solid is collected, washed with water and dried; the yield is 0.1 g., melting point 159–162° (turbid). A purified sample of the 2-amino-5-[1-(2-acetoxyethyl)-5-nitro-2-imidazolyl]thiadiazole, melts at 164–165.5°.

EXAMPLE XXV

Preparation of 2-(2-acetamido-5-thiadiazolyl)-1-(2-acetoxyethyl)-5-nitroimidazole The sample (0.1 g.) of 2-amino-5-[1-(2-hydroxyethyl)-5-nitro-2-imidazolyl]thiadiazole is added to 1.5 ml. of acetic anhydride and heated under reflux for 20 minutes. After cooling, the mixture is evaporated to dryness to give a tan solid which is slurried with ether and collected, melting point 258–265°; the yield is 0.11 g. This solid is recrystallized from acetone to give the purified product, melting point 264–268°.

EXAMPLE XXVI

Preparation of chick diet

The following feed composition is employed in all the poultry experiments hereinafter set forth except where otherwise stated:

| | Percent |
|---|---|
| Vitamin pre-mix | 0.5 |
| Trace minerals | 0.1 |
| Sodium chloride | 0.3 |
| Dicalcium phosphate | 1.2 |
| Ground limestone | 0.5 |
| Stabilized fat | 4 |
| Dehydrated alfalfa, 17% | 2 |
| Corn gluten meal, 41% | 5 |
| Menhaden fish meal, 60% | 5 |
| Soybean oil meal, 44% | 30 |
| Ground yellow corn, fine, to 100 percent. | |

The vitamin pre-mix in the above feed composition is prepared from the following formulation. The expressions of quantity relate to units per kilogram of the feed composition.

| | | |
|---|---|---|
| Butylated hydroxy toluene | mg | 125 |
| dl-Methione | mg | 500 |
| Vitamin A | I.U. | 3300 |
| Vitamin $D_3$ | I.U. | 1100 |
| Riboflavin | mg | 4.4 |
| Vitamin E | I.U. | 2.2 |
| Niacin | mg | 27.5 |
| Pantothenic acid | mg | 8.8 |
| Choline chloride | mg | 500 |
| Folic acid | mg | 1.43 |
| Menadione sodium bisulfate | mg | 1.1 |
| Vitamin $B_{12}$ | mcg | 11 |
| Ground yellow corn, fine, to 5 gm. | | |

EXAMPLE XXVII

Utilization of compounds of the present invention in controlling colibacillosis

This example demonstrates the effectiveness of 2-(2-amino-5-thiadiazolyl)-1-methyl-5-nitroimidazole and 2-(2-acetamido - 5 - thiadiazolyl)-1-methyl-5-nitroimidazole in controlling colibacillosis in poultry.

Three groups of 10 five-day old sex-linked pullet chicks are infected parenterally, in the left thoracic air sac, with 0.2 ml. of a $10^{-1}$ dilution of a Trypticase Soy Broth culture of Escherichia coli, the causative agent of colibacillosis in poultry. The compound 2-(2-amino-5-thiadiazolyl)-1-methyl-5-nitroimidazole is administered by gavage as a single oral dose in an aqueous solution or suspension, and the chicks are permitted to feed ad libitum the feed composition prepared in Example XI. Twelve days after treatment, the test is terminated and the number of survivors in each group recorded. The results are compared with two control groups of 20 chicks each, in which one control group is infected and untreated, and the second control group is uninfected and untreated. The results of the test are set forth in the following table:

TABLE I

| Compound: | Dose[1] | Total Chicks Tested | Survivors |
|---|---|---|---|
| 2-(2-amino-5-thiadiazolyl)-1-methyl-5-nitroimidazole | 160 | 10 | 10 |
|  | 80 | 10 | 10 |
|  | 40 | 10 | 10 |
| 2-(2-amino-5-oxadiazolyl)-1-methyl-5-nitroimidazole | 80 | 20 | 15 |
|  | 20 | 20 | 13 |
|  | 5 | 20 | 7 |
| Control: |  |  |  |
| Infected—Untreated |  | 20 | 2 |
| Uninfected—Untreated |  | 20 | 20 |

[1] Dose is in terms of milligrams per kilogram of body weight.

Four groups of 40, five-day old sex-linked pullet chicks are infected in the same manner as herein set forth with *Escherichia coli*. The compound 2-(2-acetamido-5-thiadiazolyl)-1-methyl-5-nitroimidazole is administered by gavage as a single oral dose in an aqueous medium, and the chicks are permitted to feed ad libitum the feed composition prepared in Example XI. Twelve days after treatment, the test is terminated and the number of survivors in each group recorded. The results are compared with two control groups of 40 chicks each, in which one control group is infected and untreated, and the second control group is uninfected and untreated. The results of the test are set forth in the following table.

TABLE II

| Compound: 2-(2-acetamido-5-thiadiazolyl)-1-methyl-5-nitroimidazole | Dose[1] | Total Chicks Tested | Survivors |
|---|---|---|---|
|  | 40 | 40 | 39 |
|  | 20 | 40 | 35 |
|  | 10 | 40 | 29 |
| Control: |  |  |  |
| Infected—Untreated |  | 40 | 3 |
| Uninfected—Untreated |  | 40 | 40 |

[1] Dose is in terms of milligrams per kilogram of body weight.

EXAMPLE XXVIII

Utilization of compounds of the present invention in controlling fowl typhoid

This example demonstrates the effectiveness of 2-(2-amino - 5 - thiadiazolyl) - 1 - methyl - 5 - nitroimidazole, 2-(2-acetamido-5-thiadiazolyl)-1-methyl-5-nitroimidazole, 2-(2-methylamino - 5 - thiadiazolyl)-1-methyl - 5 - nitroimidazole and 2-(2-dimethylamino - 5 - thiadiazolyl)-1-methyl-5-nitroimidazole in controlling fowl typhoid.

Nine groups, eight groups of five and one of ten, of one-day old sex-linked pullet chicks are infected orally by gavage with 0.5 ml. of a $10^{-2}$ dilution of a five-hour Trypticase Soy Broth culture of *Salmonella gallinarum*, the causative agent of fowl typhoid. Each chick received approximately $6 \times 10^5$ viable cells.

Medication is administered continuously in the feed, beginning 3 hours before infection and continuing for 10 days, at which time the test is terminated and the number of survivors in each group recorded. The results are compared with two control groups of chicks, the first group comprising 20 chicks which are infected and untreated, and the second group comprising 10 chicks which are uninfected and untreated. The results of the test are set forth in the followable table:

TABLE III

| Compound: | Dose[1] | Total Chicks Tested | Survivors |
|---|---|---|---|
| 2-(2-amino-5-thiadiazolyl)-1-methyl-5-nitroimidazole | 0.1 | 10 | 9 |
|  | 0.05 | 5 | 5 |
|  | 0.025 | 5 | 5 |
|  | 0.006 | 5 | 1 |
| 2-(2-acetamido-5-thiadiazolyl)-1-methyl-5-nitroimidazole | 0.1 | 5 | 5 |
|  | 0.025 | 5 | 4 |
|  | 0.006 | 5 | 3 |
| 2-(2-methylamino-5-thiadiazolyl)-1-methyl-5-nitroimidazole | 0.1 | 5 | 3 |
| 2-(2-dimethylamino-5-thiadiazolyl)-1-methyl-5-nitroimidazole | 0.1 | 5 | 4 |
| Control: |  |  |  |
| Infected—Untreated |  | 20 | 0 |
| Uninfected—Untreated |  | 10 | 10 |

[1] Dose is in terms of percentage by weight of the feed composition prepared in Example XI.

EXAMPLE XXIX

Utilization of a compound of the present invention in controlling enteritis

This example demonstrates the effectiveness of 2-(2-amino-5-thiadiazolyl)-1-methyl-5-nitroimidazole in controlling enteritis.

Three groups of ten female Swiss Webster mice weighing 20 gm. were infected intraperitoneally with 0.5 ml. of $10^{-2}$ dilution of a five-hour Trypticase Soy Broth culture of *Salmonella choleraesuis* var. kunzendorf, the causative agent of enteritis in pigs, an organism originally recovered from a field outbreak of *Salmonella choleraesuis* var. kunzendorf in pigs. Each mouse received approximately $4.6 \times 10^7$ cells as the inoculating dose.

The mice are fed a medicated feed, which is a commercial mouse chow containing the compound 2-(2-amino-2-thiadiazolyl)-1-methyl - 5 - nitroimidazole, for 3 hours before infection until 7 days after infection. The mice are held for an additional 7 days after the medication is stopped, and the number of survivors in each group recorded. The medicated feed is prepared by thoroughly admixing calculated amounts of 2-(2-amino - 5 - thiadiazolyl) - 1 methyl - 5 - nitroimidazole with commercial mouse chow to provide essentially uniform distribution in the feed offered. The above results are compared with two control groups of ten mice each, in which one control group is infected and untreated, and the second control group is uninfected and untreated. The results of the test are set forth in the following table:

TABLE IV

| Compound: 2-(2-amino-5-thiadiazolyl)-1-methyl-5-nitroimidazole | Dose[1] | Total Mice Tested | Survivors |
|---|---|---|---|
|  | 0.1 | 10 | 10 |
|  | 0.025 | 10 | 9 |
|  | 0.006 | 10 | 1 |
| Control: |  |  |  |
| Infected—Untreated |  | 10 | 2 |
| Uninfected—Untreated |  | 10 | 10 |

[1] Dose is in terms of percentage by weight of the commercial mouse chow.

EXAMPLE XXX

Utilization of compounds of the present invention in controlling *Trichomonas vaginalis* infections This example demonstrates, employing two modes of administration, the efficacy of 2-(2-amino-5-thiadiazolyl)-1-methyl-5-nitroimidazole against *Trichomonas vaginalis* infections.

The first mode of administration, hereinafter designated Test A, employs six groups of mice, three groups of five and three groups of ten. The mice are inoculated with 50,000 culture-derived *Trichomonas vaginalis* (Thoms strain). The above compound is thoroughly mixed into ground feed and presented to the mice one day after inoculation. The average ad libitum drug intake, that is milligrams per kilogram of body weight per day, is estimated from the drug diet intake for 5 full days, and mouse weights taken just before and just after treatment.

The second mode of administration, hereinafter designated Test B, employs six groups of mice, five groups of ten and one of five. The mice are inoculated with 50,000 culture-derived *Trichomonas vaginalis* (Thoms strain). The above compound is administered in a single oral dose by gavage one day after inoculation.

Six days of post inoculation scrapings, from the subcutaneous sites of inoculation, are searched microscopically for motile trichomonads, and antitrichomonal activity is concluded in those instances where motile trichomonads are eliminated from lesions present at the site of inoculation.

Mouse body weight gain from day 1 to day 6 post-inoculation shows that 2-(2-amino - 5 - thiadiazolyl) - 1-methyl-5-nitroimidazole is well tolerated by the animals ingesting same. Furthermore, experimentation demonstrates that more than 1,000 mg. per kilogram of body weight of said compound is well tolerated.

The results of the test are set forth in the following tables:

TABLE V.—TEST A

| Compound | Dose[1] | Total Mice Tested | Cleared | Percentage Cleared |
|---|---|---|---|---|
| 2-(2-amino-5-thiadiazolyl)-1-methyl-5-nitroimidazole | 170 | 5 | 5 | 100 |
|  | 95 | 5 | 5 | 100 |
|  | 90 | 10 | 10 | 100 |
|  | 65 | 5 | 4 | 80 |
|  | 44 | 10 | 3 | 30 |
|  | 10 | 10 | 0 | 0 |

[1] Dose is in terms of milligrams per kilogram of body weight per da

TABLE VI.—TEST B

| Compound | Dose[1] | Total Mice Tested | Cleared | Percentage Cleared |
|---|---|---|---|---|
| 2-(2-amino-5-thiadiazolyl)-1-methyl-5-nitroimidazole | 100 | 5 | 5 | 100 |
|  | 50 | 10 | 10 | 100 |
|  | 50 | 10 | 10 | 100 |
|  | 25 | 10 | 9 | 90 |
|  | 12 | 10 | 7 | 70 |
|  | 6 | 10 | 2 | 20 |

[1] Dose is in terms of milligrams per kilogram of body weight.

EXAMPLE XXXI

Utilization of compounds of the present invention in controlling coccidiosis

The anti-coccidial activity of the compounds of the invention is demonstrated by the following tests; Rhode Island Red male × Barred Rock female across cockerels, 7 days old and of approximately equal size and weight, were divided into groups and the groups placed in separate cages with wire floors. A broiler feed diet of the formulation set forth below and having graded levels of test medicament intimately blended therewith was prepared and administered to the various groups. The formulation used was as follows:

Formulation:
- Corn yellow, fine ground _____ lbs./ton__ 1,200
- Soybean, fine ground _____ lbs./ton__ 400
- Corn gluten meal _____ lbs./ton__ 100
- Fish meal _____ lbs./ton__ 100
- Alfalfa meal _____ lbs./ton__ 40
- Distillers solubles _____ lbs./ton__ 50
- Mico mix 8009 limecrest+$M_nSO_4$ _lbs./ton__ 40
- Bone meal (steamed) _____ lbs./ton__ 30
- NaCl _____ lbs./ton__ 10
- Chlorine chloride (25%) _____ lbs./ton__ 2

Formulation:
- Fortafeed (2–49C) _____ lbs./ton__ 2
  - 2 g. riboflavin
  - 4 g. pantothenic/lb.
  - 9 g. niacin
  - 10 g. choline
- Vitamin A+D, dry _____ lbs./ton__ 2
  - 2,00 μ/g. $D_3$
  - 10,000 μ/g. A
- Profactor—B _____ mg./ton__ 10

The medicated and unmedicated diets were presented to the chicks and the chicks were permitted to feed and drink ad libitum from two days prior until 7 days following the oral inoculation with sporulated oocysts of *Eimeria tenella*. The number of oocysts inoculated directly into the crops of all chicks in the test was sufficient to produce 85–100% mortality in the untreated controls. The quantity necessary to produce this mortality rate was determined prior to the time of inoculation by giving graded quantities of oocysts to comparable birds. Seven days following inoculation the test was terminated and the mortality rate recorded for each group.

The results obtained are provided in Table VII where it can be seen that the compounds of this invention are highly effective as anti-coccidial agents.

TABLE VII

| Structure | Parts per million in diet | No. Birds Treated | Percent Survival |
|---|---|---|---|
| 2-(2-amino-5-thiadiazolyl)-1-methyl-5-nitroimidazole | 0 | 39 | 15 |
|  | 125 | 10 | 100 |
|  | 60 | 10 | 70 |
|  | 30 | 10 | 20 |
| 2-(2-acetamido-5-thiadiazolyl)-1-methyl-5-nitroimidazole | 0 | 20 | 15 |
|  | 125 | 10 | 100 |
|  | 60 | 10 | 100 |
|  | 30 | 10 | 0 |
| 2-(2-methylamino-5-thiadiazolyl)-1-methyl-5-nitroimidazole | 0 | 40 | 12 |
|  | 125 | 10 | 100 |
|  | 60 | 10 | 90 |
|  | 30 | 10 | 60 |
|  | 15 | 10 | 0 |
| 2-(2-dimethylamino-5-thiadiazolyl)-1-methyl-5-nitroimidazole | 0 | 20 | 10 |
|  | 125 | 10 | 100 |
|  | 60 | 5 | 80 |
|  | 30 | 5 | 60 |
| 2-(2-formamido-5-thiadiazolyl)-1-methyl-5-nitroimidazole | 0 | 20 | 15 |
|  | 125 | 10 | 100 |
|  | 60 | 10 | 80 |
|  | 30 | 10 | 40 |
| 2-amino-5-(1-methyl-5-nitro-2-imidazolyl)oxadiazole | 0 | 20 | 15 |
|  | 500 | 5 | 100 |
| 2-dimethylamino-5-(1-methyl-5-nitro-2-imidazolyl)-1,3,4-oxadiazole | 0 | 20 | 40 |
|  | 250 | 5 | 100 |
| N,N-dimethyl-N'-[5-(1-methyl-5-nitro-2-imidazolyl)-thiadiazolyl-2-yl]formamidine | 0 | 20 | 40 |
|  | 125 | 5 | 100 |
|  | 60 | 5 | 60 |
| 2-[2-(4-piperazinyl)-5-thiadiazolyl]-1-methyl-5-nitroimidazole | 0 | 40 | 20 |
|  | 125 | 5 | 100 |
|  | 60 | 5 | 0 |

Although the invention has been described and illustrated by reference to particular embodiments thereof, it will be understood that in its broadest aspects the invention is not limited to such embodiments and that variation and substitution of such equivalents may be made.

What is claimed is:
1. A nitroimidazole of the formula:

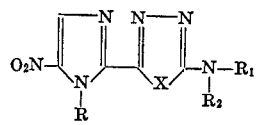

wherein R is selected from the group consisting of lower alkyl, hydroxy lower alkyl and lower alkanoyloxy lower alkyl; X is selected from the group consisting of oxygen and sulfur; and $R_1$ and $R_2$ are selected from the group consisting of hydrogen, lower alkyl, hydroxy lower alkyl, formyl, lower alkanoyl, monohalolower alkanoyl, dihalo lower alkanoyl, aminolower alkyl, lower alkyl aminolower alkyl;

taken together is selected from the group consisting of —N=CHN (lower alkyl)$_2$, piperazine, lower alkylpiperazine, benzylpiperazine, phenylpiperazine, tolylpiperazine, lower alkoxyphenylpiperazine, halophenylpiperazine, nitrophenylpiperazine, pyridylpiperazine, quinolylpiperazine, thiazolylpiperazine, lower alkoxycarbonylpiperazine, and lower alkylthio thionocarbonylpiperazine.

2. Nitroimidazoles in accordance with claim 1: 2-(2-diloweralkylamino-5-thiadiazolyl)-1-lower alkyl-5 - nitroimidazole.

3. The nitroimidazole in accordance with claim 1: 2-(2-acetamido-5-thiadiazolyl)-1-methyl-5-nitroimidazole.

4. The nitroimidazole in accordance with claim 1: 2-(2-methylamino-5-thiadiazolyl)-1-methyl-5-nitroimidazole.

5. The nitroimidazole in accordance with claim 1: 2-(2-amino-5-ozadiazolyl)-1-methyl-5-nitroimidazole.

6. The nitroimidazole in accordance with claim 1: 2-(2-formamido-5-thiadiazolyl)-1-methyl-5-nitroimidazole.

7. The nitroimidazole in accordance with claim 1: 2-(2-amino-5-thiadiazolyl)-1-methyl-5-nitroimidazole.

8. The nitroimidazole in accordance with claim 1: 2-(2-amino-5-thiadiazolyl) - 1 - (2 - hydroxyethyl) - 5 - nitroimidazole.

References Cited

UNITED STATES PATENTS 3,025,303   3/1962   Ifversen et al. _____ 260—306.8

NICHOLAS S. RIZZO, *Primary Examiner.*

R. J. GALLAGHER, *Assistant Examiner.*

U.S. Cl. X.R.

260—268, 307; 424—250, 270, 272